United States Patent
Ahn et al.

(10) Patent No.: US 12,080,876 B2
(45) Date of Patent: Sep. 3, 2024

(54) COMPOSITE SULFIDE ELECTRODE AND MANUFACTURING METHOD THEREFOR

(71) Applicant: SK INNOVATION CO., LTD., Seoul (KR)

(72) Inventors: Jou Hyeon Ahn, Jinju-si (KR); Younki Lee, Jinju-si (KR); Gyu Bong Cho, Jinju-si (KR); Kwon-Koo Cho, Jinju-si (KR); Hyo Jun Ahn, Jinju-si (KR)

(73) Assignee: SK ON CO., LTD., Seoul (KR)

(*) Notice: Subject to any disclaimer, the term of this patent is extended or adjusted under 35 U.S.C. 154(b) by 524 days.

(21) Appl. No.: 17/421,003

(22) PCT Filed: Nov. 21, 2019

(86) PCT No.: PCT/KR2019/016015
§ 371 (c)(1),
(2) Date: Jul. 6, 2021

(87) PCT Pub. No.: WO2020/145504
PCT Pub. Date: Jul. 16, 2020

(65) Prior Publication Data
US 2022/0102705 A1   Mar. 31, 2022

(30) Foreign Application Priority Data
Jan. 7, 2019   (KR) .................. 10-2019-0001587

(51) Int. Cl.
*H01M 4/1397*   (2010.01)
*H01M 4/04*   (2006.01)
(Continued)

(52) U.S. Cl.
CPC ......... *H01M 4/1397* (2013.01); *H01M 4/049* (2013.01); *H01M 4/136* (2013.01);
(Continued)

(58) Field of Classification Search
CPC ........ C01G 49/12; D01D 10/02; D01D 5/003; D01D 5/0038; D01F 1/10; D01F 11/06;
(Continued)

(56) References Cited

U.S. PATENT DOCUMENTS

| 10,388,952 B2 | 8/2019 | Park et al. |
| 2014/0030580 A1* | 1/2014 | Tenzer .............. H01M 10/0468 429/213 |

(Continued)

FOREIGN PATENT DOCUMENTS

| JP | 2013037960 A | 2/2013 |
| JP | 2013-054957 A | 3/2013 |

(Continued)

OTHER PUBLICATIONS

Machine translation WO2016193216A1 (Year: 2016).*
(Continued)

*Primary Examiner* — Victoria H Lynch
(74) *Attorney, Agent, or Firm* — IP & T GROUP LLP

(57) ABSTRACT

A composite sulfide electrode and a manufacturing method therefor are disclosed. A method for manufacturing a composite sulfide electrode comprises the steps of: preparing a mixed solution of polyacrylonitrile (PAN) and a metallic oxide; stirring the prepared mixed solution; electrospinning the stirred mixed solution to prepare a wire-type precursor bearing a metallic oxide in PAN; drying the prepared wire-type precursor; mixing the dried wire-type precursor and a sulfur powder; and injecting a gas to the mixture of the wire-type precursor and the sulfur powder to sulfurize the wire-type precursor.

15 Claims, 17 Drawing Sheets

(51) Int. Cl.
*H01M 4/136* (2010.01)
*H01M 4/36* (2006.01)
*H01M 4/58* (2010.01)
*H01M 4/75* (2006.01)
*H01M 4/80* (2006.01)
*D01D 5/00* (2006.01)

(52) U.S. Cl.
CPC ......... *H01M 4/362* (2013.01); *H01M 4/5815* (2013.01); *H01M 4/75* (2013.01); *H01M 4/806* (2013.01); *D01D 5/003* (2013.01)

(58) Field of Classification Search
CPC ....... D01F 6/18; H01M 10/052; H01M 4/049; H01M 4/131; H01M 4/136; H01M 4/1397; H01M 4/362; H01M 4/364; H01M 4/5815; H01M 4/75; H01M 4/806; Y02E 60/10
See application file for complete search history.

(56) References Cited

U.S. PATENT DOCUMENTS

| | | | |
|---|---|---|---|
| 2015/0280218 A1 | 10/2015 | Zimmerman et al. | |
| 2017/0200955 A1 | 7/2017 | Sulek et al. | |
| 2018/0127895 A1* | 5/2018 | Schweiss | D06M 13/503 |

FOREIGN PATENT DOCUMENTS

| | | | |
|---|---|---|---|
| JP | 2017218584 A | 12/2017 | |
| KR | 100675923 B1 | 1/2007 | |
| KR | 20140065515 A | 5/2014 | |
| KR | 101486955 B1 | 1/2015 | |
| KR | 20160011097 A | 1/2016 | |
| KR | 101610354 B1 | 4/2016 | |
| KR | 20160143711 A | 12/2016 | |
| KR | 20170036606 A | 4/2017 | |
| KR | 101802301 B1 | 11/2017 | |
| KR | 20180074178 A | 7/2018 | |
| WO | 2016/019544 A1 | 2/2016 | |
| WO | WO-2016193216 A1 * | 12/2016 | |

OTHER PUBLICATIONS

International Search Report for PCT Application No. PCT/KR2019/016015 filed on Nov. 21, 2019, on behalf of Industry-Academic Cooperation Foundation Gyeongsang National University. Mail Date: Mar. 9, 2020. 5 Pages. KR Original + English Translation.
Notice of Preliminary Rejection for Korean Patent Application No. 10-2019-0001587 filed on Jan. 7, 2019, on behalf of Industry-Academic Cooperation Foundation Gyeongsang National University. Issuance Date: May 21, 2020. 8 Pages. KR Original + English Translation.
Written Opinion for PCT Application No. PCT/KR2019/016015 filed on Nov. 21, 2019 on behalf of Industry-Academic Cooperation Foundation Gyeongsang National University. Mail Date: Mar. 9, 2020. 8 Pages. KR Original + English Translation.
Office Action for the Japanese Patent Application No. 2021-562771 issued by the Japanese Patent Office on Mar. 28, 2023.
Office Action for the Japanese Patent Application No. 2021-562771 issued by the Japanese Patent Office on Aug. 30, 2022.

* cited by examiner

COMPOSITE SULFIDE ELECTRODE AND MANUFACTURING METHOD THEREFOR

CROSS REFERENCE TO RELATED APPLICATIONS

The present application is the U.S. national stage entry of international patent application no. PCT/KR2019/016015 filed on Nov. 21, 2019, which, in turn, claims priority to South Korean patent application no. 10-2019-0001587 filed on Jan. 7, 2019.

TECHNICAL FIELD

Apparatuses and methods consistent with the disclosure relate to a composite sulfide electrode and a manufacturing method therefor, and more particularly, to a composite sulfide electrode including a synthesized heterogeneous sulfide and a manufacturing method therefor.

BACKGROUND ART

Since an energy demand for high-energy density application such as an electric car and an energy storage system (ESS) increases, an interest in an advanced energy storage system is increasing. From this point of view, recently, lithium and sodium-based energy storage systems have been actively studied. For commercialization of a high-energy density application, it is essential to develop a high-performance electrode material in both a lithium-ion battery (LIB) and a sodium-ion battery (SIB). Theoretically, a transition metal sulfide having a high capacity is spotlighted as an electrode material for lithium and sodium ion storage. However, like $FeS_2$ which is a widely studied electrode material for a secondary battery, practical applications are limited due to an irreversible capacity loss caused by a polysulfide product produced in a cycling process and an agglomeration action and formation of nano $Fe^0$. In addition, a huge strain due to a large volume change breaks an electrode structure and limits a cycle life.

Therefore, there is a need for a composite material sulfide electrode which may improve a capacity of a sulfide-based electrode and reproducibility (cyclability) without damaging energy density.

DISCLOSURE

Technical Problem

An aspect of the disclosure provides a composite sulfide electrode which has excellent characteristics and simplifies a process and a manufacturing method therefor.

Technical Solution

According to an embodiment of the disclosure, a manufacturing method for a composite sulfide electrode includes: producing a mixed solution of polyacrylonitrile (PAN) and a metal oxide, stirring the produced mixed solution, electrospinning the stirred mixed solution to produce a wire type precursor including the metal oxide in PAN, drying the produced wire type precursor, mixing the dried wire type precursor and sulfur powder, and thermally treating a mixture of the wire type precursor and the sulfur powder to sulfurize the wire type precursor.

In the producing of a mixed solution, the PAN and metal oxide may be mixed at a ratio of 5:1 to 1:5.

In addition, in the mixing of the dried wire type precursor and sulfur powder, the dried wire type precursor and the sulfur powder may be mixed at a ratio of 1:1 to 1:9.

In addition, in the sulfurizing, the wire type precursor may be sulfurized in an argon atmosphere at 500 to 700° C. for 5 hours to 7 hours.

Meanwhile, the metal oxide may include a metal component such as Fe, Ni, Co, or Cu.

According to another embodiment of the disclosure, a composite sulfide electrode manufactured by the above method is provided.

The composite sulfide electrode may include an active material in the form of fibers, and the active material in the form of fibers may include sulfurized polyacrylonitrile (SPAN) and a metal sulfide included in the form of particles inside SPAN.

Meanwhile, the metal sulfide may be a metal component such as Fe, Ni, Co, or Cu bonded to a sulfur component.

Advantageous Effects

As described above, according to various embodiments of the disclosure, the composite sulfide electrode and the manufacturing method therefor may provide a composite active material electrode including both a metal sulfide and SPAN.

Also, the composite sulfide electrode and the manufacturing method therefor may improve the capacity and life of the metal sulfide due to SPAN having high theoretical capacity and stability.

In addition, the composite sulfide electrode and the manufacturing method therefor may provide a dual active material electrode having a synergistic effect for a high-energy density application by complementing a conductive problem of SPAN due to a metal sulfide.

The effects of the disclosure are not limited by the effects mentioned above, and other effects which have not been mentioned may be clearly understood by an ordinary person skilled in the art from the following description.

BEST MODE FOR INVENTION

Figure 1:
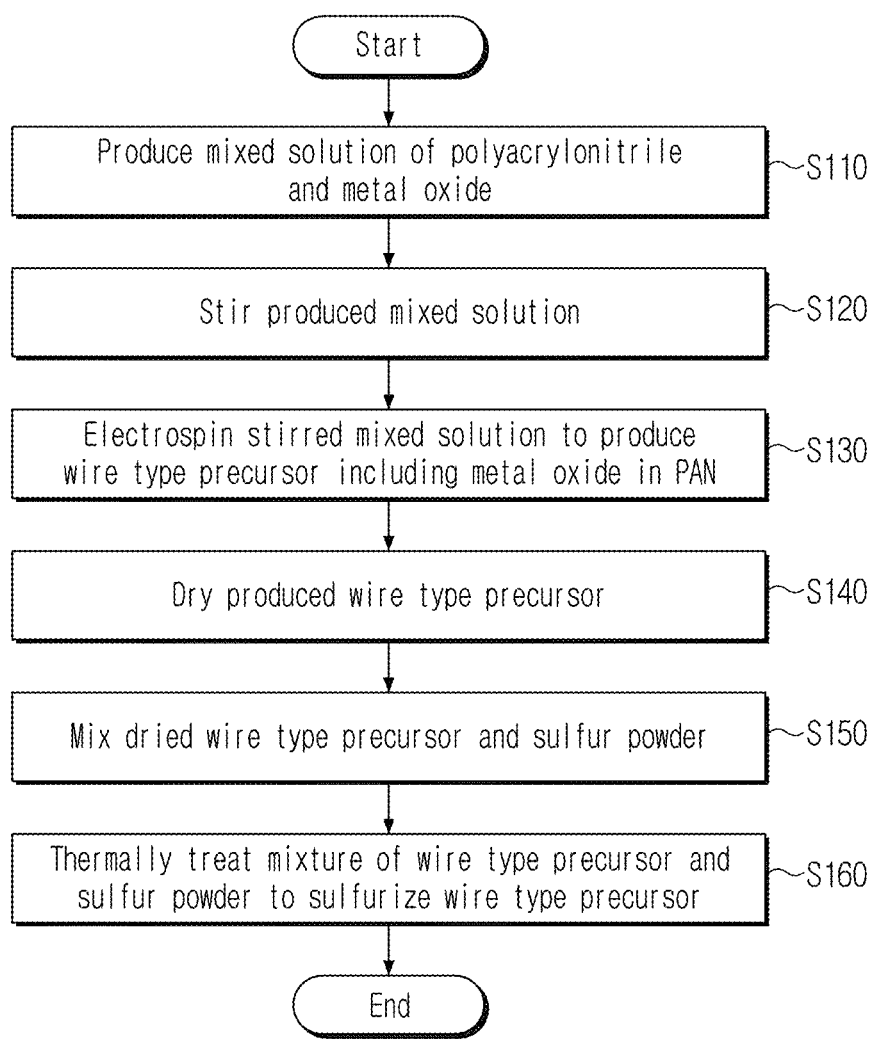
FIG. 1 is a flowchart of a manufacturing method for a composite sulfide electrode according to an embodiment of the disclosure.

Hereinafter, various embodiments will be described in more detail, referring to the attached drawings. The embodiments described in the specification may be variously modified. Specific embodiments are illustrated in the drawings, and may be described in detail in the detailed description. However, specific embodiments disclosed in the attached drawing may be only for easily understanding various embodiments. Therefore, it should be understood that the technical idea is not limited by the specific embodiments disclosed in the attached drawings, and all equivalents or substitutes included in the spirit and technical scope of the disclosure are included.

Terms including ordinal numbers such as first and second may be used for describing various elements, but these elements are not limited by the terms described above. The terms described above are used only to distinguish one element from other elements.

It will be further understood that the terms "comprises" or "have" used in the specification, specify the presence of stated features, steps, operations, elements, parts, or a combination thereof, but do not preclude the presence or addition of one or more other features, numerals, steps, operations, elements, parts, or a combination thereof. It is to be understood that when one element is referred to as being "connected to" or "coupled to" another element, it may be connected directly to or coupled directly to another element or be connected to or coupled to another element having the other element intervening therebetween. On the other hand, it is to be understood that when one element is referred to as being "connected directly to" or "coupled directly to" another element, it may be connected to or coupled to another element without the other element intervening therebetween.

Besides, in the description of the disclosure, if it is determined that the detailed description of relevant known functions or components makes subject matters of the disclosure obscure, the detailed description thereof will be abbreviated and omitted. Meanwhile, each embodiment may be independently implemented or operated, but may be also implemented or operated in combination.

Figure 2:
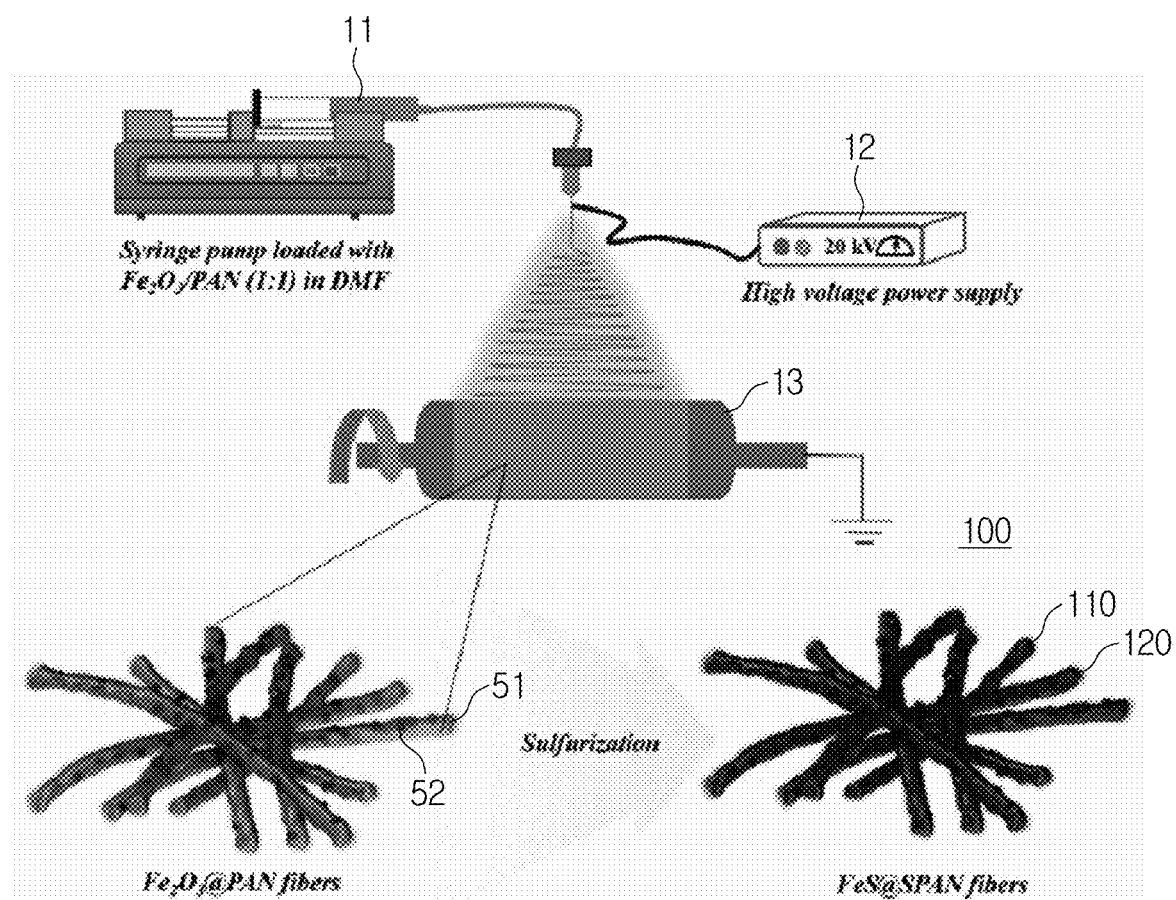
FIG. 2 is a drawing for describing a process of manufacturing a composite sulfide electrode according to an embodiment of the disclosure.

FIG. 1 is a flowchart of a manufacturing method for a composite sulfide electrode according to an embodiment of the disclosure, and FIG. 2 is a drawing for describing a process of manufacturing a composite sulfide electrode according to an embodiment of the disclosure. With reference to FIGS. 1 and 2, a manufacturing process of a composite sulfide electrode will be described.

The composite sulfide electrode includes sulfurized polyacrylonitrile (SPAN) including a metal sulfide (MwSz). The sulfurized polyacrylonitrile including the metal sulfide may be formed in the form of fibers. A sulfurized polyacrylonitrile fiber including the metal sulfide may be synthesized by an electrospinning method followed by a sulfurization process.

For manufacturing the composite sulfide electrode, first, the manufacturing process of the composite sulfide electrode involves a process of producing a mixed solution of polyacrylonitrile and a metal oxide (MxOy) (S110). The metal oxide may include a metal component such as Fe, Ni, Co, or Cu. For example, when the metal oxide is $Fe_2O_3$, PAN and $Fe_2O_3$ nanoparticles may be uniformly dispersed in 10 ml of a N,N-dimethylformamide (DMF) solution at a ratio of about 5:1 to 1:5. That is, the mixed solution may be produced by mixing PAN and the metal oxide at a ratio of about 5:1 to 1:5.

The manufacturing process of the composite sulfide electrode involves a process of stirring the produced mixed solution (S120). For example, the mixed solution may be stirred for about 6 hours to 12 hours so as to be uniformly stirred.

The manufacturing process of the composite sulfide electrode involves a process of electrospinning the stirred mixed solution to produce a wire type precursor including the metal oxide in PAN (S130). For example, the manufacturing process of the composite sulfide electrode may involve a degassing process of degassing the mixed solution. Then, the manufacturing process of the composite sulfide electrode may involve adding the mixed solution to a syringe 11 provided in a syringe pump and performing an electrospinning process to produce metal oxide/PAN nanofibers. The electrospinning process refers to a process of applying voltage by a high-voltage power supplier 12, and rotating a current collector 13 connected to a ground to obtain the metal oxide/PAN nanofibers on the surface of the current collector 13. As an embodiment, operating voltage may be 20 kV, a flow velocity may be 0.3 mlh-1, a distance between a needle tip and the current collector may be 15 cm, and a humidity may be maintained at 26-28%. The obtained metal oxide/PAN nanofibers may be in the form of a fibrous mat. When the metal oxide/PAN nanofibers are a wire type precursor and the metal oxide is $Fe_2O_3$, $Fe_2O_3$/PAN nanofibers may be produced. That is, as illustrated in FIG. 2, the $Fe_2O_3$/PAN nanofibers may be in the form of $Fe_2O_3$ 52 nanoparticles being distributed inside PAN 51.

The manufacturing process of the composite sulfide electrode involves a process of drying the produced wire type precursor (S140). The produced wire type precursor in the form of a fibrous mat may be dried for removing a residual solvent. For example, the produced wire type precursor in the form of a fibrous mat may be dried under a vacuum state for about 6 hours.

The manufacturing process of the composite sulfide electrode involves a process of mixing the dried wire type precursor with sulfur powder (S150). For example, the wire type precursor and the sulfur powder may be mixed at a ratio of about 1:1 to 1:9.

The manufacturing process of the composite sulfide electrode involves a process of injecting gas to a mixture of the wire type precursor and the sulfur powder to sulfurize the wire type precursor (S160). For example, the mixture of the wire type precursor and the sulfur powder may be sulfurized at a speed of about 5° C./min as a lamp speed under an argon atmosphere at a temperature of about 500° C. to 700° C. for about 5 hours to 7 hours. By the process described above, a metal sulfide-incorporated sulfurized polyacrylonitrile nanofiber may be obtained. As described above, when in the manufacturing process of the composite sulfide, the metal oxide is $Fe_2O_3$, FeS or $FeS_2$-incorporated sulfurized polyacrylonitrile (SPAN) nanofiber may be obtained. Depending on a mixing ratio of the wire type precursor and the sulfur powder, iron sulfide or iron disulfide may be incorporated to the sulfurized polyacrylonitrile nanofiber.

In addition, when the metal oxide includes a metal component such as Fe, Ni, Co, or Cu, the metal sulfide may include a metal component such as Fe, Ni, Co, or Cu, respectively. The thus-obtained metal sulfide-incorporated sulfurized polyacrylonitrile nanofiber may be used as a composite sulfide electrode. That is, as illustrated in FIG. 2, the composite sulfide electrode may include iron sulfide 120 inside the sulfurized polyacrylonitrile nanofiber 110.

Figure 3:
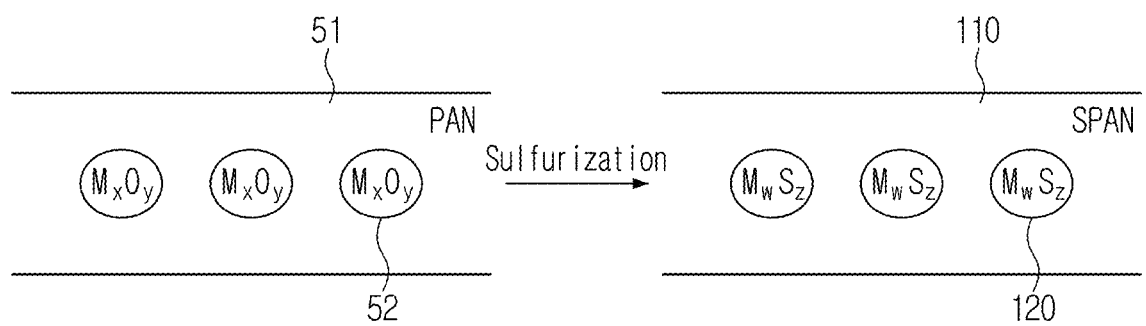
FIG. 3 is a drawing for describing a composite sulfide electrode according to an embodiment of the disclosure.

FIG. 3 is a drawing for describing a composite sulfide electrode according to an embodiment of the disclosure.

Referring to FIG. 3, a wire type precursor is illustrated. The wire type precursor may be PAN 51 in which particles of a metal oxide (MxOy) 52 are distributed. As described above, the wire type precursor may be obtained by electrospinning a mixed solution of PAN and a metal oxide. The metal oxide 52 may include a metal component such as Fe, Ni, Co, or Cu. The wire type precursor may be sulfurized. Sulfurization may be performed under an argon atmosphere after mixing the dried wire type precursor and the sulfur powder. When the wire type precursor is sulfurized, a nanofiber of metal sulfide (MwSz) 120-incorporated SPAN 110 may be obtained. For example, when the metal oxide is $Fe_2O_3$, the metal sulfide may be FeS. The sulfurized nanofiber may include particles of the metal sulfide 120 inside SPAN 110. Both SPAN 110 and the metal sulfide 120 may serve as a positive electrode active material.

In the case of conventional technology, only SPAN or FeS is used as a positive electrode active material. An electrode using SPAN as an active material has an advantage of stability but a disadvantage of deteriorated capacity of conductivity, and an electrode using FeS as an active material has an advantage of capacity or conductivity but a disadvantage of deteriorated stability. However, since the composite sulfide electrode of the disclosure includes FeS (or metal sulfide) particles inside SPAN, it may have both the advantage of the electrode using FeS as an active material and the advantage of the electrode using SPAN as an active material. In addition, the SPAN of the composite sulfide electrode of the disclosure may be sulfurized graphite. Therefore, though the conventional electrode further requires a conductive material and a binder, in addition to the active material, the SPAN of the composite sulfide electrode of the disclosure may serve as the conductive material, and thus, does not require any additional conductive material. In addition, the composite sulfide electrode of the disclosure has a structure having FeS (or metal sulfide) particles being incorporated into SPAN, it has an advantage of requiring no additional binder.

Hereinafter, as an embodiment, results of analyzing a sample in which the metal oxide is $Fe_2O_3$ and the metal sulfide is FeS will be described. Morphological analysis of electrospun nanofiber ($Fe_2O_3$/PAN fiber) and composite sulfide nanofiber (FeS/SPAN fiber) was performed with field emission scanning electron microscopy (FE-SEM), and the structural characteristic was determined by recording diffraction patterns of the sample using an X-ray diffractometer having a Cu Ka X-ray source. A high-resolution transmission electron microscope (HR-TEM) image was recorded and analyzed using a transmission electron microscope operated at an accelerating voltage of 300 kV for confirming structural and morphological aspects of the composite sulfurized nanofiber. The characteristic peak of FeS/SPAN was analyzed by FT-IR spectroscope and HR micro Raman spectrometer. Amount of an active material content (FeS/SPAN) was measured by thermo-gravimetric analysis of a sample at a lamp speed of 10° C.·min$^{-1}$ from room temperature to 800° C. under atmospheric pressure. An X-ray photoelectron spectroscopy spectrum (XPS) was collected using a monochromatic Al Ka X-ray source.

Figure 4A:
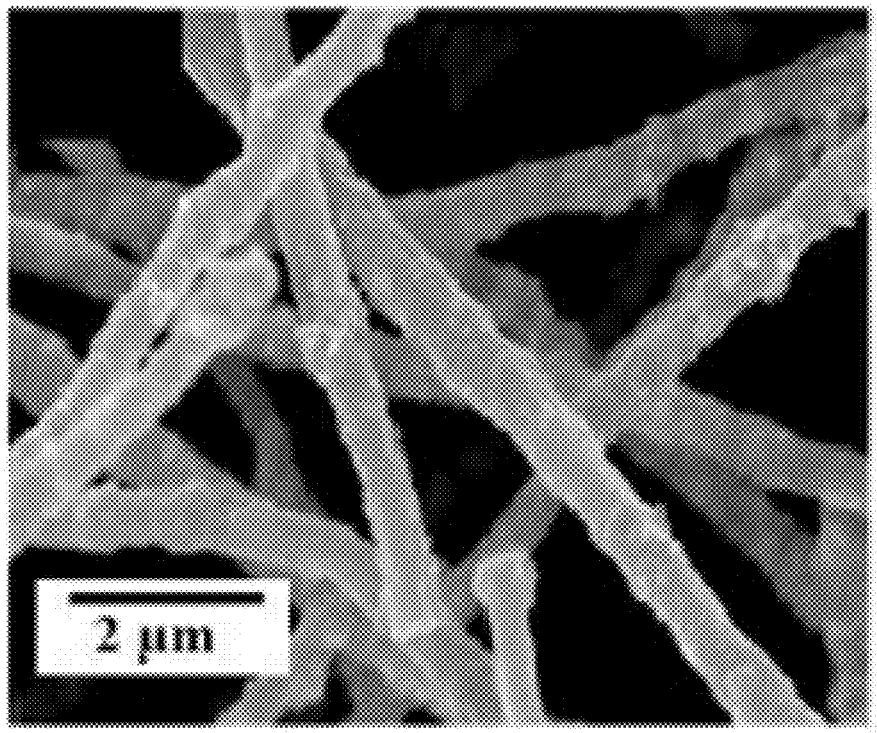
FIGS. 4A and 4B are drawings for showing a scanning electron microscope image according to an embodiment of the disclosure.
Figure 4B:
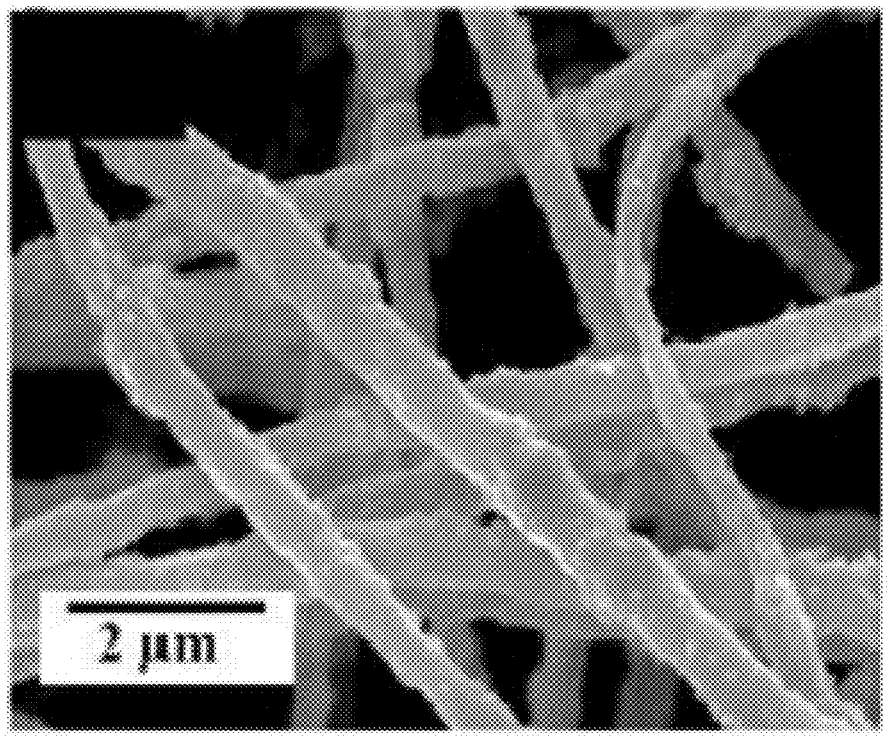

FIGS. 4A and 4B are drawings for showing a scanning electron microscope image according to an embodiment of the disclosure.

FIG. 4A is an FE-SEM image of an electrospun $Fe_2O_3$/PAN fiber, and FIG. 4B is an FE-SEM image of a sulfurized FeS/SPAN fiber. As illustrated in FIG. 4A, the electrospun $Fe_2O_3$/PAN may have an average diameter of about 200 nm. It was shown that the fibers before and after sulfurization had no large change in the FE-SEM image.

Figure 4C:
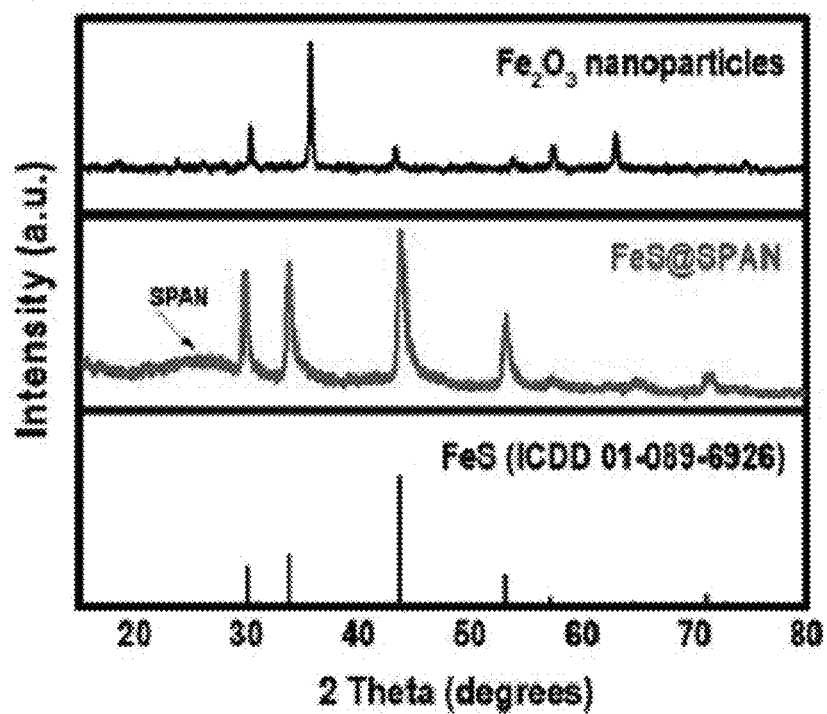
FIG. 4C is a drawing for showing an X-ray diffraction pattern according to an embodiment of the disclosure.

FIG. 4C is a drawing for showing an X-ray diffraction pattern according to an embodiment of the disclosure.

A main X-ray diffraction peak of the FeS/SPAN fiber may be assigned to ICCD card No. 01-089-6926 corresponding to hexagonal iron sulfide. However, a broad graphite-like peak may be seen at 24-28° corresponding to (002) plane as a result of dehydrogenation, cyclization, and covalent bond formation of sulfur and PAN similar to disordered carbon, and is consistent with a pure SPAN synthesized product synthesized by sulfurization of a PAN fiber. In addition, a crystalline peak of a sulfur element was not observed in the composite, which means that the sulfur element completely reacted with $Fe_2O_3$ and PAN to form a FeS-embedded SPAN fiber matrix.

Figure 5A:
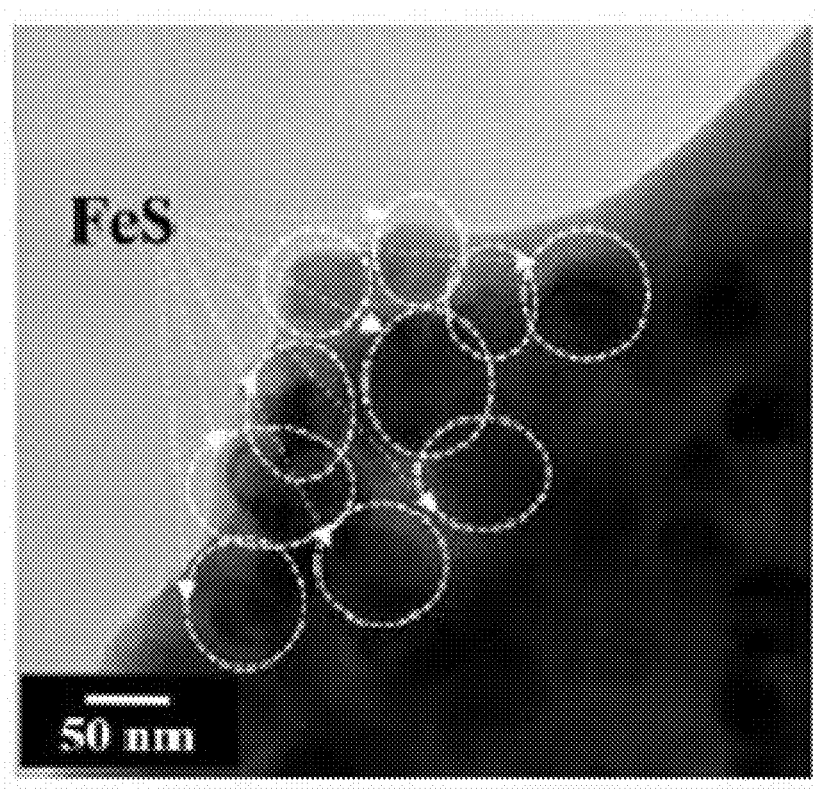
FIGS. 5A and 5B are drawings for showing TEM images according to an embodiment of the disclosure.
Figure 5B:
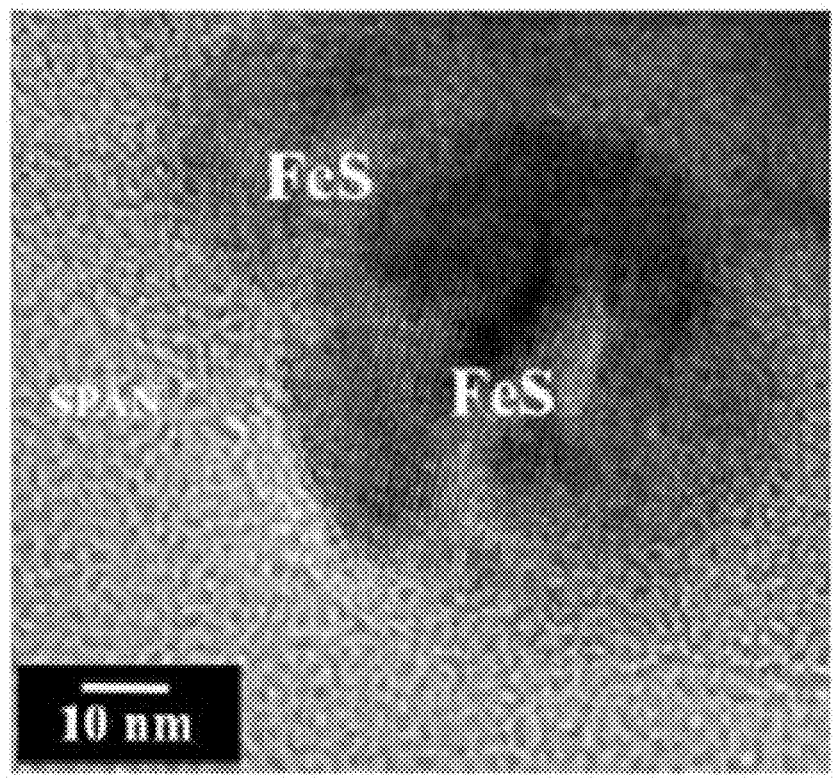

FIGS. 5A and 5B are drawings for showing TEM images according to an embodiment of the disclosure.

FIG. 5A is a TEM image of a fiber matrix including FeS nanoparticles. Referring to FIG. 5A, it is seen that FeS having various sizes (about ≤70 nm) is included in the sulfurized fiber matrix. FIG. 5B is a high-resolution TEM image of the FeS/SPAN fiber. Referring to FIG. 5B, a plane spacing of FeS (about 0.26 nm) corresponding to (101) plane is confirmed.

Figure 5C:
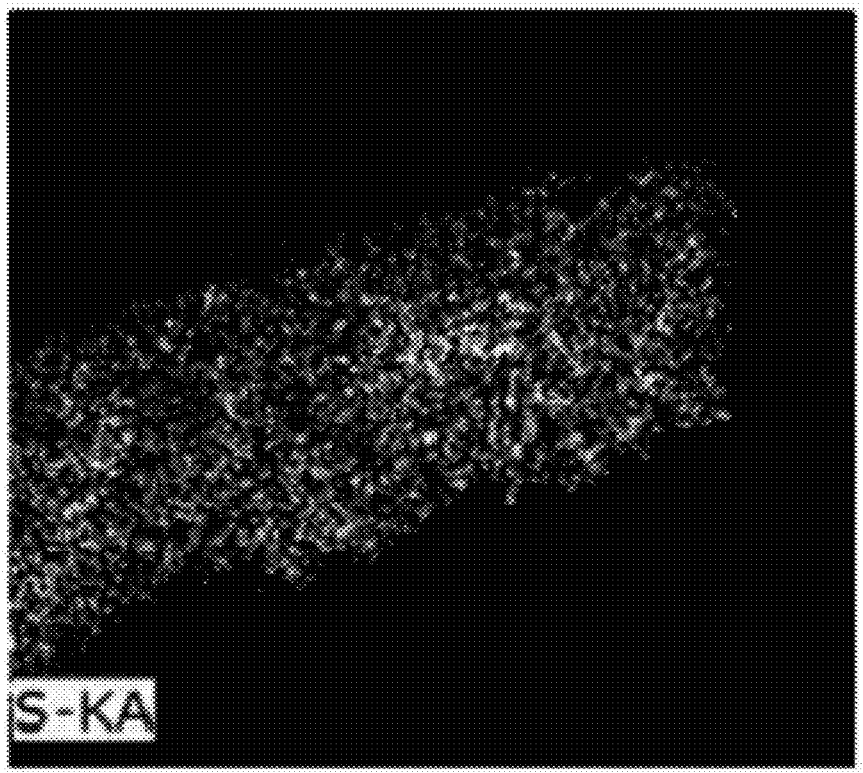
FIGS. 5C and 5D are drawings for showing EDS mapping images according to an embodiment of the disclosure.
Figure 5D:
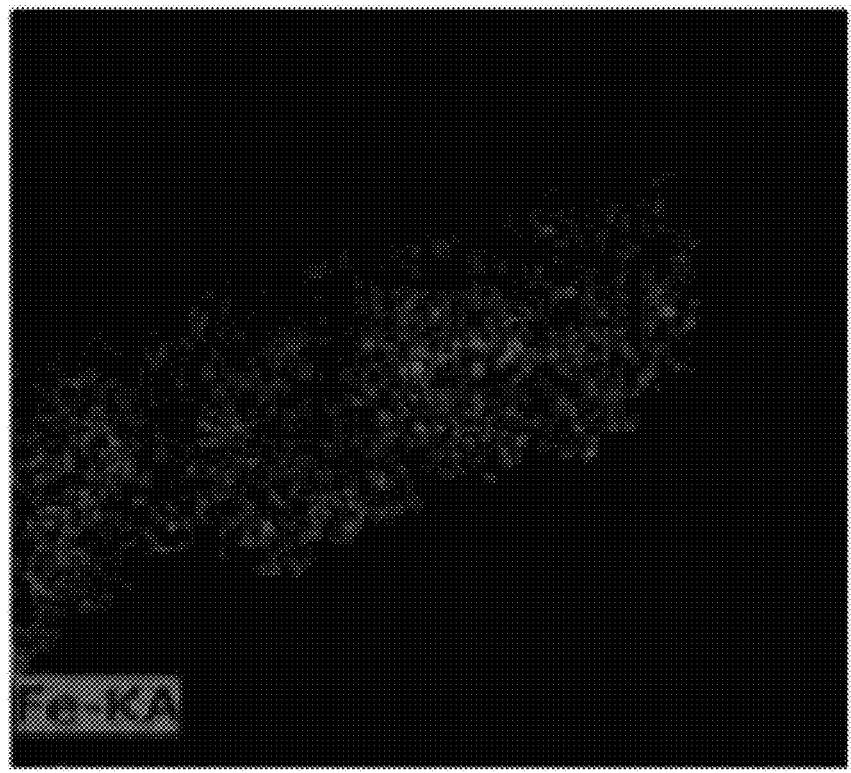

FIGS. 5C and 5D are drawings for showing EDS mapping images according to an embodiment of the disclosure.

FIG. 5C is an EDS mapping image of a synthesized product (composite sulfurized fiber) to a sulfur element, and FIG. 5D is an EDS mapping image of a synthesized product to an iron element. Referring to FIGS. 5C and 5D, it is confirmed that an iron element and a sulfur element coexist.

Figure 6A:
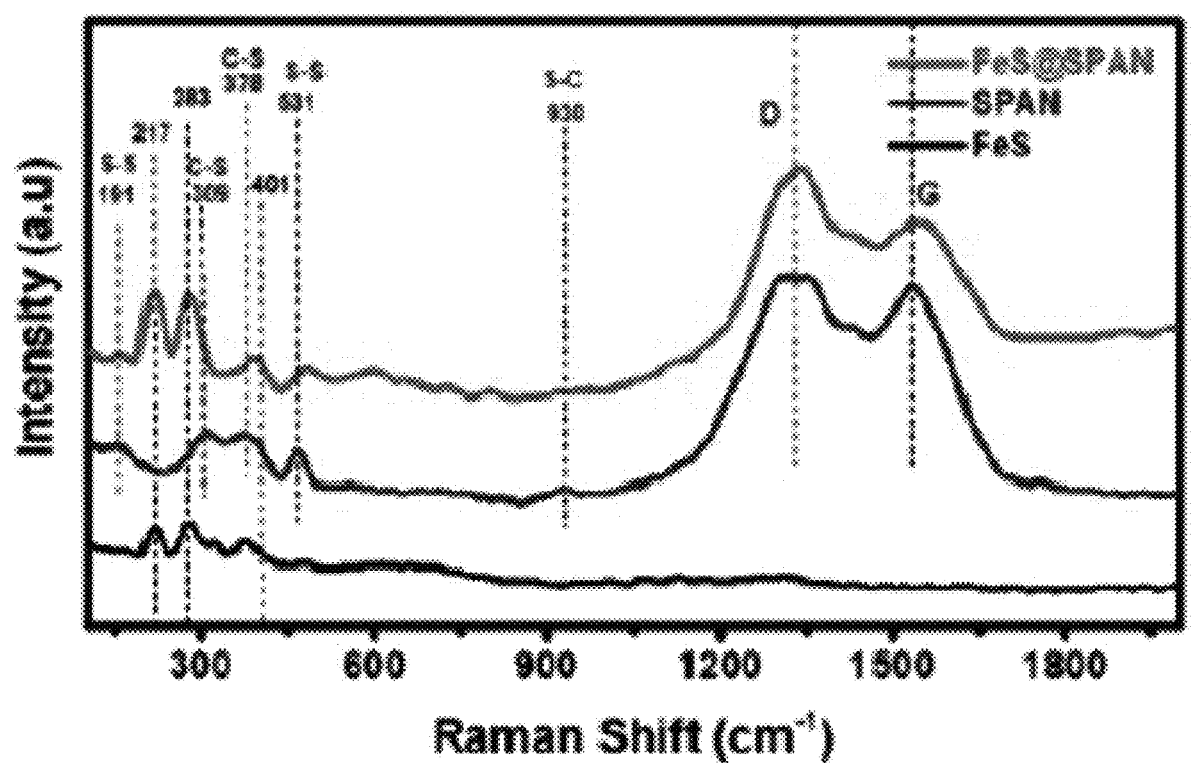
FIG. 6A is a drawing for showing a Raman spectrum image according to an embodiment of the disclosure.
Figure 6B:
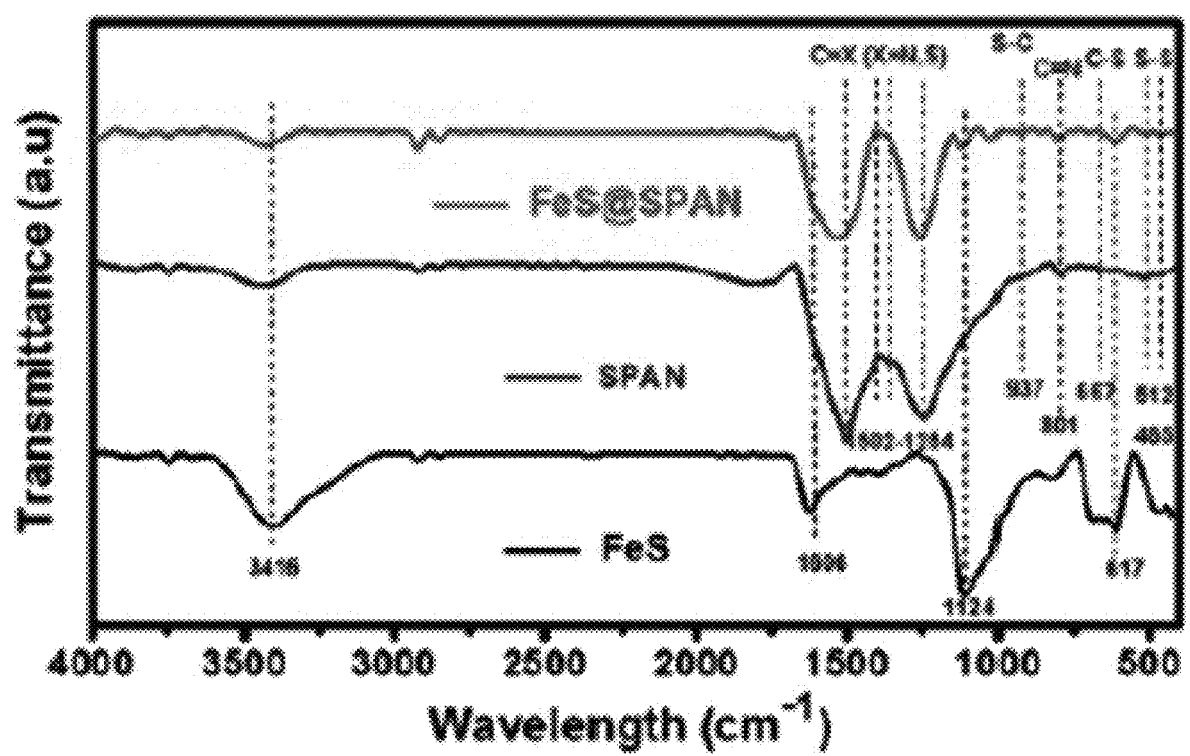
FIG. 6B is a drawing for showing a FTIR spectrum image according to an embodiment of the disclosure.
Figure 6C:
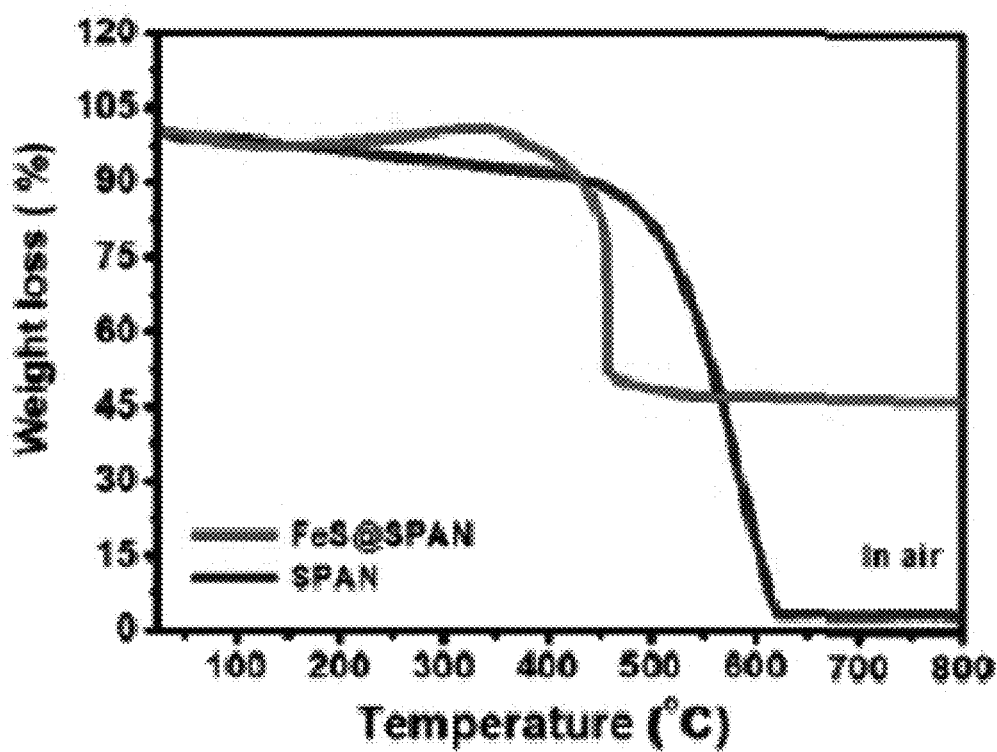
FIG. 6C is a drawing for showing a TGA curve according to an embodiment of the disclosure.

FIG. 6A is a drawing for showing a Raman spectrum image according to an embodiment of the disclosure, FIG. 6B is a drawing for showing a FTIR spectrum image according to an embodiment of the disclosure, and FIG. 6C is a drawing for showing a TGA curve according to an embodiment of the disclosure.

Referring to FIG. 6A, Raman spectra of FeS commercialized powder, an SPAN fiber, and a synthesized FeS/SPAN composite fiber are illustrated. Characteristic vibration bands at 217, 283, and 401 cm$^{-1}$ contributing to symmetrical and asymmetrical modes in FeS may be observed in the FeS/SPAN composite fiber and a commercial FeS sample. General C—S and S—S bonds observed in SPAN may be shown at 309, 378, and 930 cm$^{-1}$ also in the FeS/SPAN composite fiber. In addition, a high-strength absorbent band contributing to G mode sp2 carbon-bond stretching and D mode sp3 carbon-bond breathing on a graphite plane showing thermal decomposition of PAN, respectively may be obtained in both SPAN and FeS/SPAN composite fibers around 1325 and 1513 cm$^{-1}$. Generally, it was shown that an $I_D/I_G$ ratio represents a level of disorder/defect of a material, and largely, was increased when a synthesis temperature was 1000° C. or lower.

Referring to FIG. 6B, the FT-IR spectrum of the FeS/SPAN composite fiber is consistent with 3416, 1606, 1124, and 617 cm$^{-1}$ where characteristic peaks of commercial FeS are present. C—C and C—N symmetric stretching vibrations showing a hexagonal ring structure are clearly shown at 1500-1000 and 801 cm$^{-1}$.

Referring to FIG. 6C, the results of measuring the content of the active material of the FeS/SPAN composite fiber synthesized by thermogravimetric analysis (TGA) under atmospheric pressure are illustrated. The weight of the synthetic fiber was gradually increased at 200-350° C. by oxidizing FeS to $Fe_2O_3$. A weight loss observed at 350 to 550° C. may be resulted from oxidation of sulfur and carbon in the synthetic fiber. However, the weight of a pure SPAN fiber is rapidly decreased at 450° C. By analyzing the TGA curve, the contents of FeS and SPAN included in the composite fiber may be estimated to be about 51.61% and 48.38%. The content of the active material of the composite fiber is calculated as about ~79% considering the percentage of the amount of FeS and the active sulfur content of SPAN.

Figure 7A:
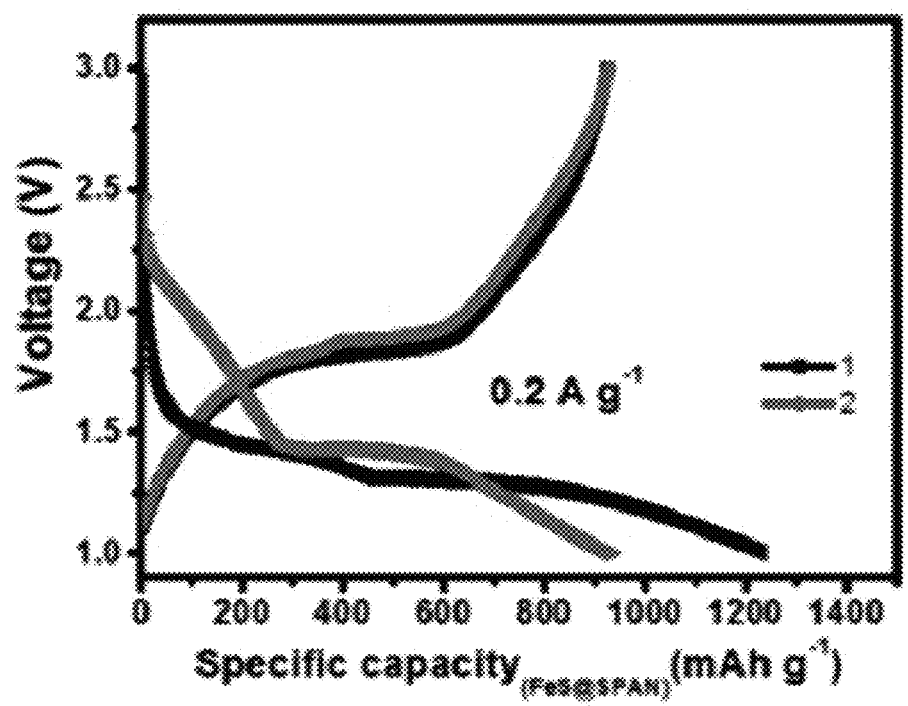
FIG. 7A is a drawing for showing a charge/discharge curve of a composite sulfide electrode of a lithium cell according to an embodiment of the disclosure.
Figure 7B:
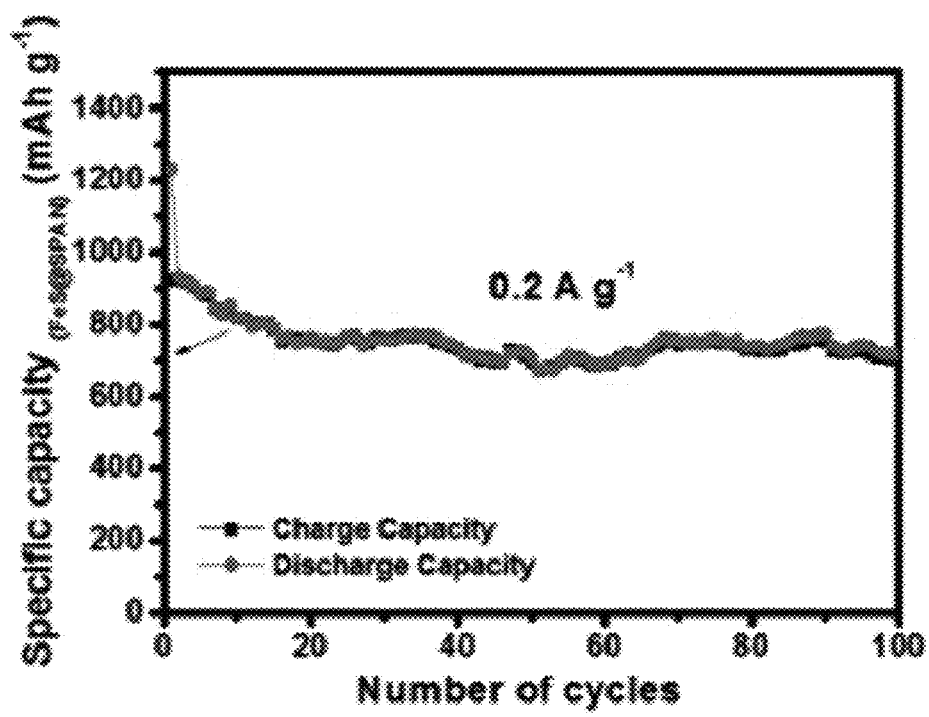
FIG. 7B is a drawing for showing cycle performance of a composite sulfide electrode of a lithium cell according to an embodiment of the disclosure.

FIG. 7A is a drawing for showing a charge/discharge curve of a composite sulfide electrode of a lithium cell according to an embodiment of the disclosure, and FIG. 7B is a drawing for showing cycle performance of a composite sulfide electrode of a lithium cell according to an embodiment of the disclosure.

The electrochemical properties of the FeS/SPAN composite electrode were analyzed in relation to lithium. FIG. 7A illustrates a charge/discharge curve of a FeS/SPAN composite electrode at a low current density of 0.2 A·g$^{-1}$. A first cycle shows two traditional discharge plateaus corresponding to SPAN and FeS, and a front plateau starts from 2.1 V and ends at 1.3 V and a rear plateau starts from 1.3 V and ends at 1 V, which is similar to a combination of charge/discharge profiles of commercial FeS and natural SPAN. A second cycle shows an initial sloppy discharge profile which is similar to SPAN followed by a flat voltage plateau at a higher potential (~1.45 V) than an initial cycle corresponding to a conversion reaction of FeS confirming both FeS and SPAN present as the active material of an electrode.

FIG. 7B shows cycling performance of the FeS/SPAN composite fiber at 0.2 a·g$^{-1}$ representing a high capacity of 716 mAh·g$^{-1}$ even after 100 cycles.

Figure 8A:
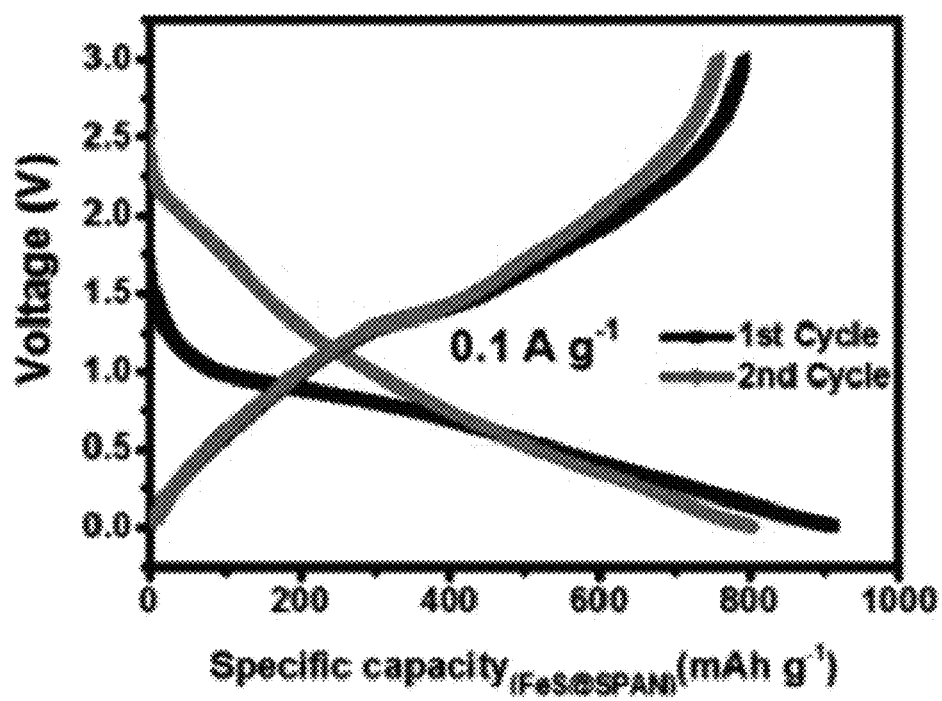
FIG. 8A is a drawing for showing a charge/discharge curve of a composite sulfide electrode of a sodium cell according to an embodiment of the disclosure.
Figure 8B:
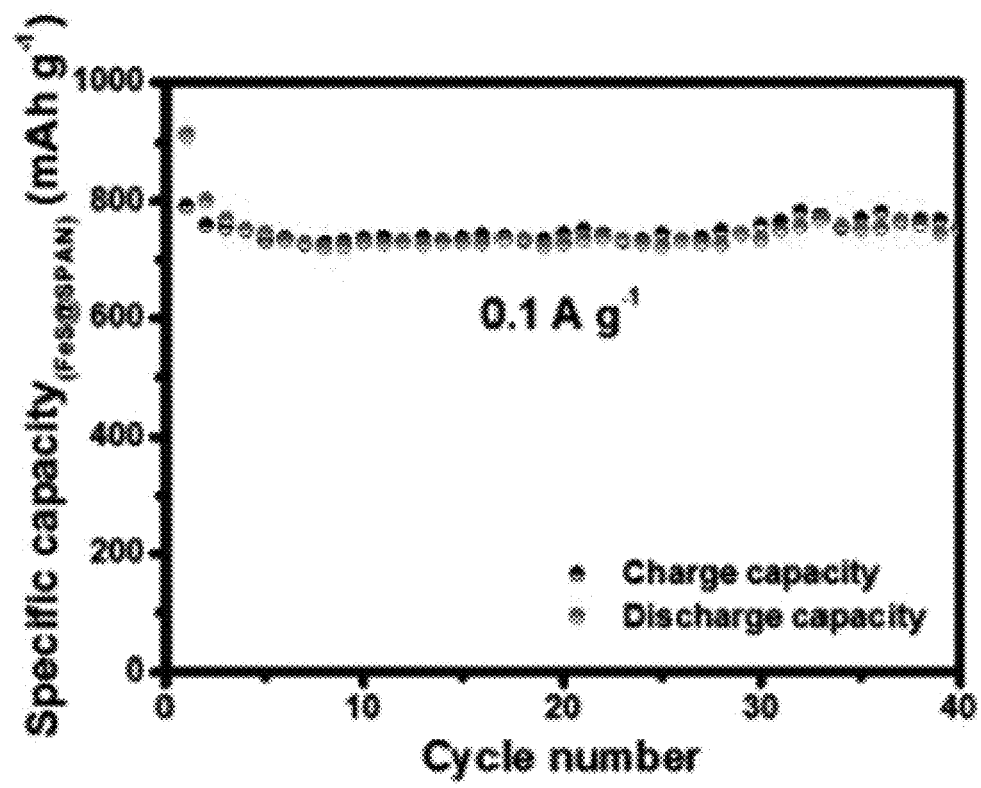
FIG. 8B is a drawing for showing cycle performance of a composite sulfide electrode of a sodium cell according to an embodiment of the disclosure.

FIG. 8A is a drawing for showing a charge/discharge curve of a composite sulfide electrode of a sodium cell according to an embodiment of the disclosure, and FIG. 8B is a drawing for showing cycle performance of a composite sulfide electrode of a sodium cell according to an embodiment of the disclosure.

The electrochemical properties of the FeS/SPAN composite electrode were analyzed in relation to sodium. Referring to FIG. 8A, a negative electrode peak at an initial cycle was shown at 1.5 V, and a negative electrode peak was shifted a little to a lower potential at a subsequent cycle. After a second cycle, capacitive behavior predominates except a main positive electrode peak represented at 1.89 V. Electrochemical properties using sodium were tested mainly at a low current density of 100 mA·g$^{-1}$. A very high discharge capacity of 910 mAh·g$^{-1}$ was obtained initially, and a discharge plateau was tilted about 1 V. After a second cycle, a charge/discharge profile was shown gently, similarly to SPAN.

Referring to FIG. 8B, the capacity of the synthesized sulfide fiber was maintained at about 83.5% (759.4 mAh·g$^{-1}$), and then maintained for 40 cycles.

As described above, the composite sulfide electrode according to the disclosure may serve as a dual active material electrode for lithium and sodium ion storage, and thus, an excellent capacity at a current speed as high as 1 A·g$^{-1}$, and a composite sulfide electrode may extend a battery cycle life due to an excellent catalyst adsorptive capacity of FeS promoting adsorption of polysulfides. The composite sulfide electrode promotes oxidation of $Li_2S$ due to Fe nanoparticles formed in the discharge process of FeS to improve a charge transfer rate of a system. In addition, the composite sulfide electrode greatly may decrease interfacial resistance as well as a lithium/sodium ion diffusion barrier due to a one-dimensional fiber form and nano-sized FeS to improve the dynamic ability of the system and may maintain an irreversible capacity and speed due to the structural stability of the composite sulfide electrode.

Although the preferred embodiments of the disclosure have been illustrated and described hereinabove, the disclosure is not limited to the specific embodiments described above, various modifications are possible by those skilled in the art, without departing from the scope and spirit of the disclosure as disclosed in the accompanying claims, of course, and such modifications should not be understood separately from the technical idea or prospect of the disclosure.

What is claimed is:

1. A manufacturing method for a composite sulfide electrode, the method comprising:
   producing a mixed solution of polyacrylonitrile (PAN) and a metal oxide;
   stirring the produced mixed solution;
   electrospinning the stirred mixed solution to produce a wire type precursor including the metal oxide in PAN;
   drying the produced wire type precursor;
   mixing the dried wire type precursor and sulfur powder;
   thermally treating a mixture of the wire type precursor and the sulfur powder to sulfurize the wire type precursor and then obtaining a sulfurized polyacrylonitrile (SPAN) incorporating metal sulfide; and
   thermally decomposing the SPAN to obtain a metal sulfide-incorporated sulfurized carbon composite.

2. The manufacturing method for a composite sulfide electrode of claim 1, wherein in the producing of a mixed solution, the PAN and the metal oxide are mixed at a ratio of 5:1 to 1:5.

3. The manufacturing method for a composite sulfide electrode of claim 1, wherein in the mixing of the dried wire type precursor and sulfur powder, the dried wire type precursor and the sulfur powder are mixed at a ratio of 1:1 to 1:9.

4. The manufacturing method for a composite sulfide electrode of claim 1, wherein in the sulfurizing, the wire type precursor is sulfurized under an argon atmosphere at a temperature of 500° C. to 700° C. for 5 hours to 7 hours.

5. The manufacturing method for a composite sulfide electrode of claim 1, wherein the metal oxide includes a metal component such as Fe, Ni, Co, or Cu.

6. A composite sulfide electrode manufactured by the method of claim 1.

7. The composite sulfide electrode of claim 6, wherein the composite sulfide electrode includes an active material in the form of fibers, and the active material in the form of fibers includes sulfurized polyacrylonitrile (SPAN) and a metal sulfide included in the form of particles inside the SPAN, wherein the SPAN is a disordered carbon material.

8. The composite sulfide electrode of claim 7, wherein the metal sulfide is a metal component such as Fe, Ni, Co, or Cu bonded to a sulfur component.

9. The manufacturing method for a composite sulfide electrode of claim 1, wherein the metal sulfide-incorporated sulfurized carbon composite is a disordered carbon material incorporating the metal sulfide.

10. The composite sulfide electrode of claim 6, wherein the metal sulfide is embedded in a disordered carbon fiber matrix.

11. The composite sulfide electrode of claim 6, wherein the composite sulfide electrode has X-ray diffraction peak at 24-28°.

12. The composite sulfide electrode of claim 6, wherein the metal sulfide is FeS or $FeS_2$.

13. The composite sulfide electrode of claim 6, wherein the composite sulfide electrode does not comprise a binder.

14. The composite sulfide electrode of claim 6, wherein the composite sulfide electrode does not comprise a conductive material.

15. The composite sulfide electrode of claim 6, wherein the composite sulfide electrode has an X-ray diffraction pattern without a crystalline peak of a sulfur element.

* * * * *